US011908639B1

(12) United States Patent
Ku

(10) Patent No.: US 11,908,639 B1
(45) Date of Patent: Feb. 20, 2024

(54) CHARACTER KEY DEVICE OF A BACKLIT KEYBOARD

(71) Applicant: SUNREX TECHNOLOGY CORP., Taichung (TW)

(72) Inventor: Chih-Po Ku, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 18/093,006

(22) Filed: Jan. 4, 2023

(30) Foreign Application Priority Data

Oct. 17, 2022 (TW) ................................. 111211297

(51) Int. Cl.
*H01H 13/02* (2006.01)
*H01H 13/20* (2006.01)
*H01H 13/14* (2006.01)

(52) U.S. Cl.
CPC .......... *H01H 13/023* (2013.01); *H01H 13/14* (2013.01); *H01H 13/20* (2013.01)

(58) Field of Classification Search
CPC ...... H01H 13/023; H01H 13/14; H01H 13/20; H01H 3/12; H01H 3/125; H01H 13/70; H01H 13/702; H01H 13/703; H01H 13/704; H01H 13/705; H01H 13/7065; H01H 13/83; H01H 2215/044; H01H 2219/014; H01H 2219/036; H01H 13/02
See application file for complete search history.

(56) References Cited

U.S. PATENT DOCUMENTS 8,592,702 B2 * 11/2013 Tsai ........................ H04M 1/22
200/344
9,443,674 B1 * 9/2016 Chen ...................... H01H 13/83
9,618,987 B2 * 4/2017 Chen ...................... H01H 13/70
9,941,076 B2 * 4/2018 Chen ...................... H01H 13/83

* cited by examiner

*Primary Examiner* — Lheiren Mae A Caroc
(74) *Attorney, Agent, or Firm* — Burris Law, PLLC

(57) ABSTRACT

A character key device includes a bottom plate, a backlight module, a film module, a support module and a key cap. The backlight module includes a metal plate, an insulating layer, a backlight circuit and a light emitter. The metal plate includes a metal plate body, and a plurality of pivot seats extending upwardly from the metal plate body. The film module is disposed on the backlight circuit. The film module defines at least one accommodating space adjacent to the backlight circuit and allowing the at least one light emitter to extend therein. The film module is pressable to generate a trigger signal. The support module includes a support disposed on the film module and connected to the pivot seats of the metal plate, and an elastomer disposed on the film module. The key cap is disposed on the support module.

7 Claims, 10 Drawing Sheets

CHARACTER KEY DEVICE OF A BACKLIT KEYBOARD

CROSS-REFERENCE TO RELATED APPLICATION

This application claims priority to Taiwanese Utility Model Patent Application No. 111211297, filed on Oct. 17, 2022.

FIELD

This disclosure relates to a character key device of a keyboard, and more particularly to a character key device of a backlit keyboard.

BACKGROUND

A conventional backlit keyboard includes a bottom plate, a circuit board disposed on the bottom plate, a metal plate disposed on the circuit board, a plurality of light emitters disposed on the circuit board and extending upwardly out of the metal plate, a touch film disposed on the metal plate, a plurality of scissor arm assemblies located respectively above the light emitters and extending downwardly through the touch film and connected pivotally to the metal plate, and a plurality of key caps respectively sleeved on top sides of the scissor arm assemblies. The circuit board is operable to drive the light emitters to emit light upwardly. When the touch film is pressed by the key caps, the touch film generates corresponding pressing signals.

However, the conventional backlit keyboard needs the circuit board to drive the light emitters, and needs the metal plate to support both the scissor arm assemblies and the key caps. The overall thickness of the conventional backlit keyboard is thus relatively large due to the thickness of the circuit board and the metal plate, which makes it difficult to achieve the purpose of thinning the backlit keyboard.

SUMMARY

Therefore, an object of the disclosure is to provide a character key device that can alleviate at least one of the drawbacks of the prior art.

According to the disclosure, the character key device includes a bottom plate, a backlight module, a film module, a support module and a key cap. The backlight module includes a metal plate fixed to the bottom plate, an insulating layer disposed on the metal plate, a backlight circuit disposed on the insulating layer, and at least one light emitter electrically connected to the backlight circuit and disposed above the insulating layer. The metal plate includes a metal plate body, and a plurality of pivot seats extending upwardly from the metal plate body. The film module is disposed on the backlight circuit. The film module defines at least one accommodating space adjacent to the backlight circuit and allowing the at least one light emitter to extend therein. The film module is pressable to generate a trigger signal. The support module includes a support disposed on the film module and connected to the pivot seats of the metal plate, and an elastomer disposed on the film module. The key cap is disposed on the support module, and has an inner peripheral surface connected to the support and in contact with the elastomer, and an outer peripheral surface opposite to the inner peripheral surface.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
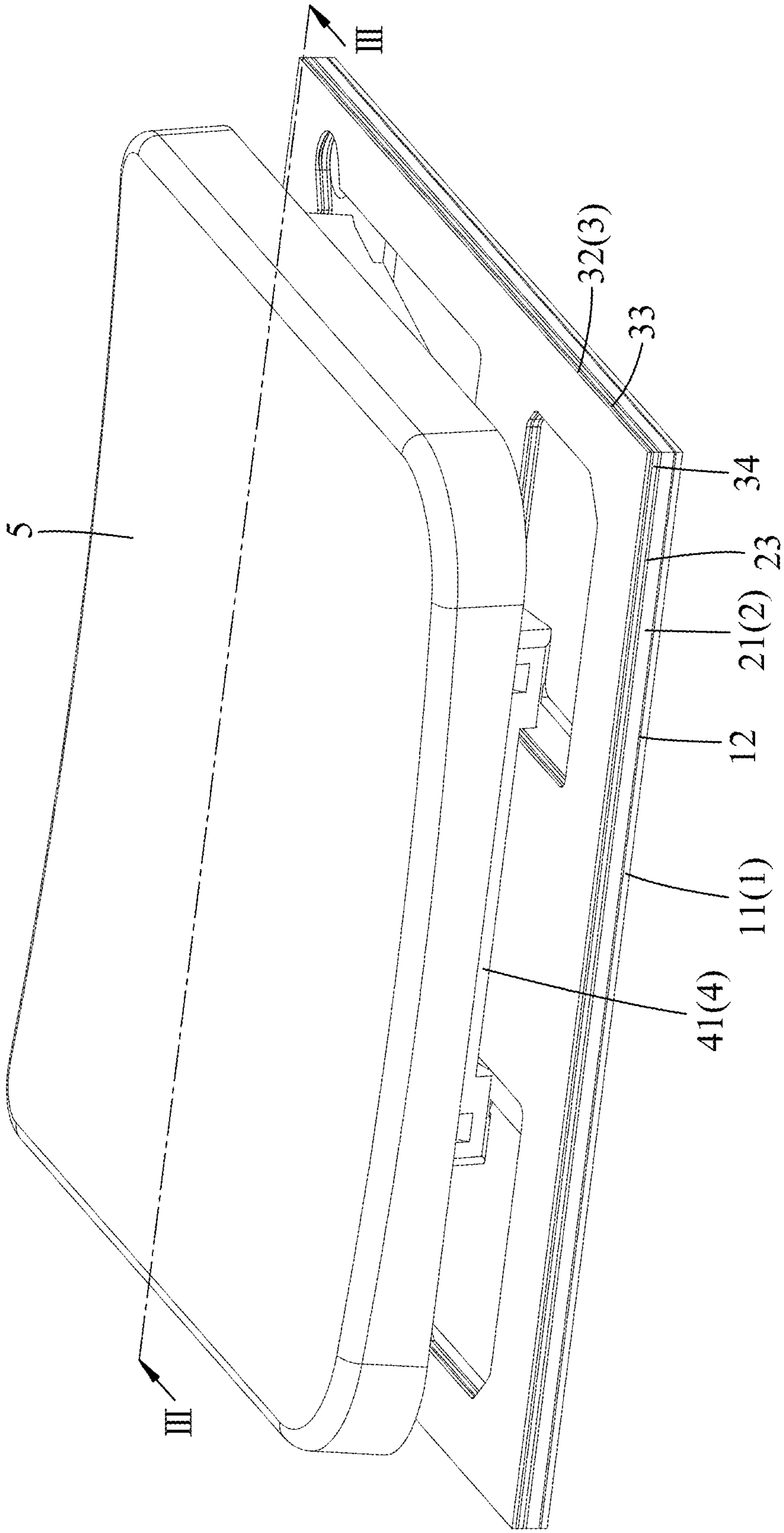
FIG. 1 is an assembled perspective view of a first embodiment of the character key device of a backlit keyboard according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
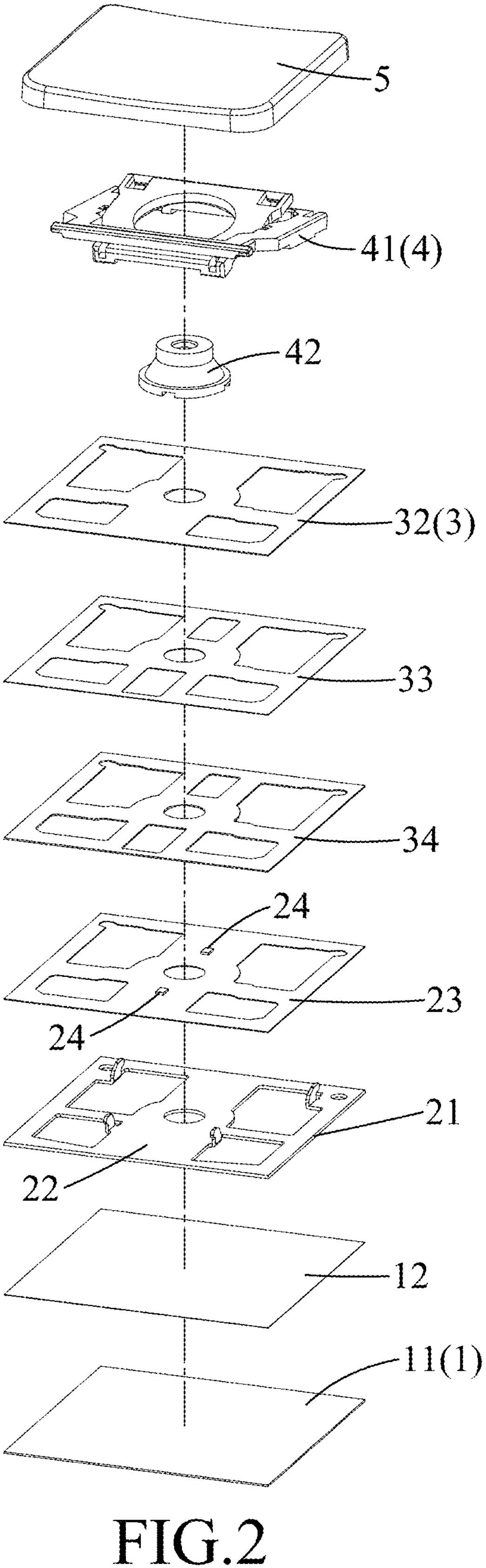
FIG. 2 is an exploded perspective view of the first embodiment.
Figure 3:
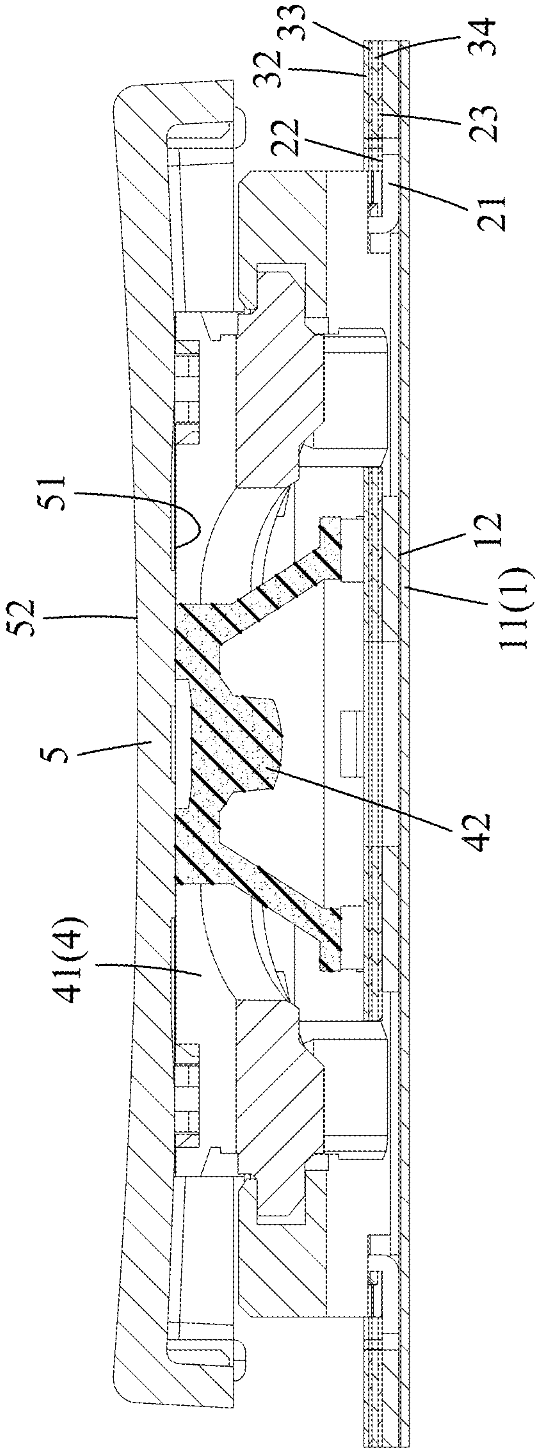
FIG. 3 is a sectional view of the first embodiment taken along line III-III of FIG. 1.

Referring to FIGS. 1 to 3, a first embodiment of the character key device of a backlit keyboard according to the present disclosure includes a bottom plate 1, a backlight module 2, a film module 3, a support module 4, and a key cap 5.

The bottom plate 1 includes a bottom plate body 11, and an adhesive layer 12 disposed on the bottom plate body 11.

The backlight module 2 includes a metal plate 21 fixedly connected to the bottom plate 1, an insulating layer 22 laid on the metal plate 21, a backlight circuit 23 laid on the insulating layer 22, and two light emitters 24 electrically connected to the backlight circuit 23 and located above the insulating layer 22.

The metal plate 21 is disposed on the adhesive layer 12 to be fixedly connected to the bottom plate body 11. The metal plate 21 has a metal plate body 211 and four pivot seats 212 extending upwardly from the metal plate body 211. In the present embodiment, the number of the pivot seats 212 is four, but in other modifications, the number of the pivot seats 212 may be adjusted as desired.

In the present embodiment, the material of the insulating layer 22 is an insulating ink.

In the present embodiment, the material of the backlight circuit 23 is copper.

In the present embodiment, the number of the light emitters 24 is two. In other modifications, the number of the light emitters 24 may be one or more than two.

Figure 4:
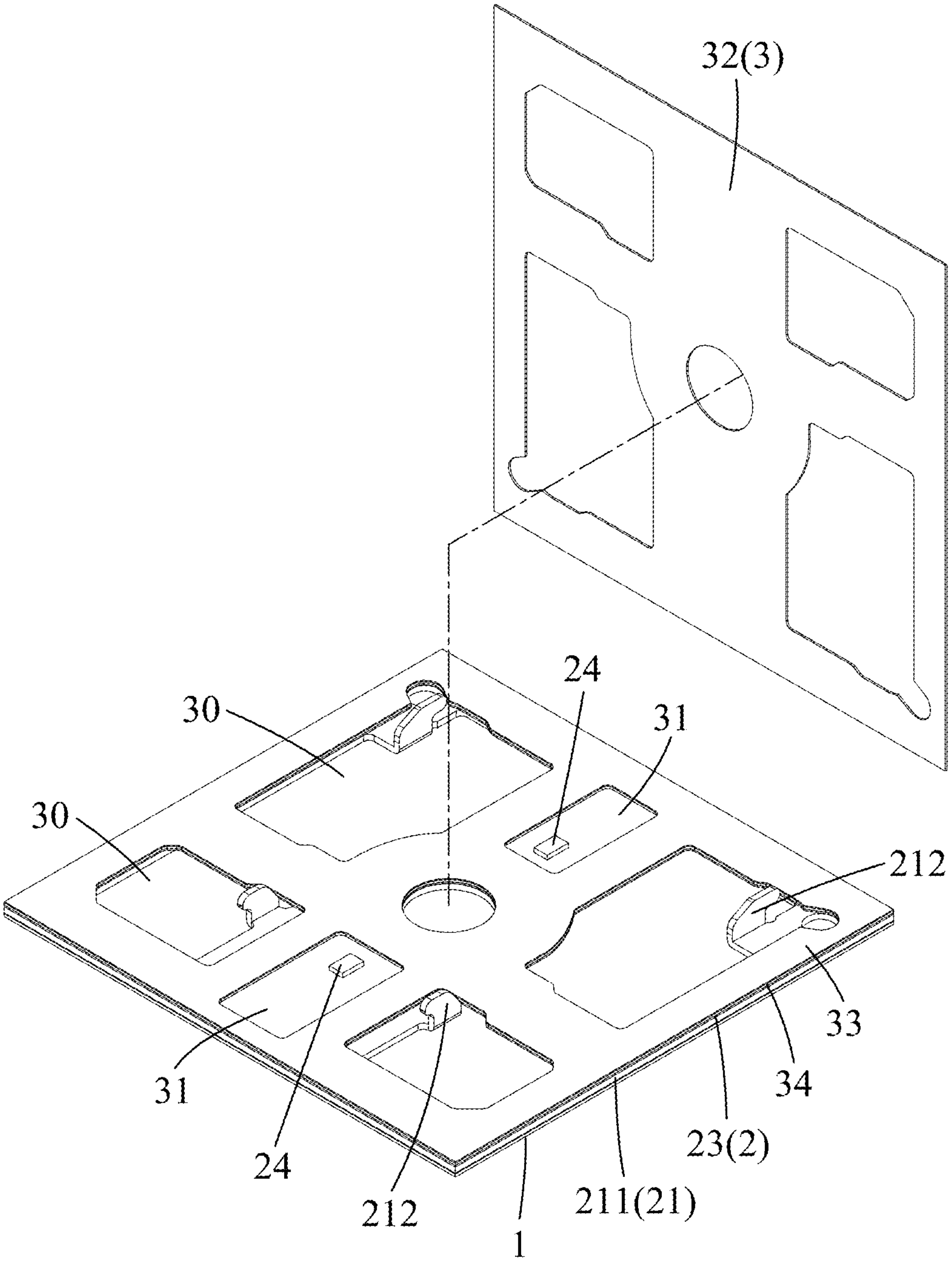
FIG. 4 is a partly exploded perspective view illustrating a bottom plate, a backlight module and a film module of the first embodiment.
Figure 5:
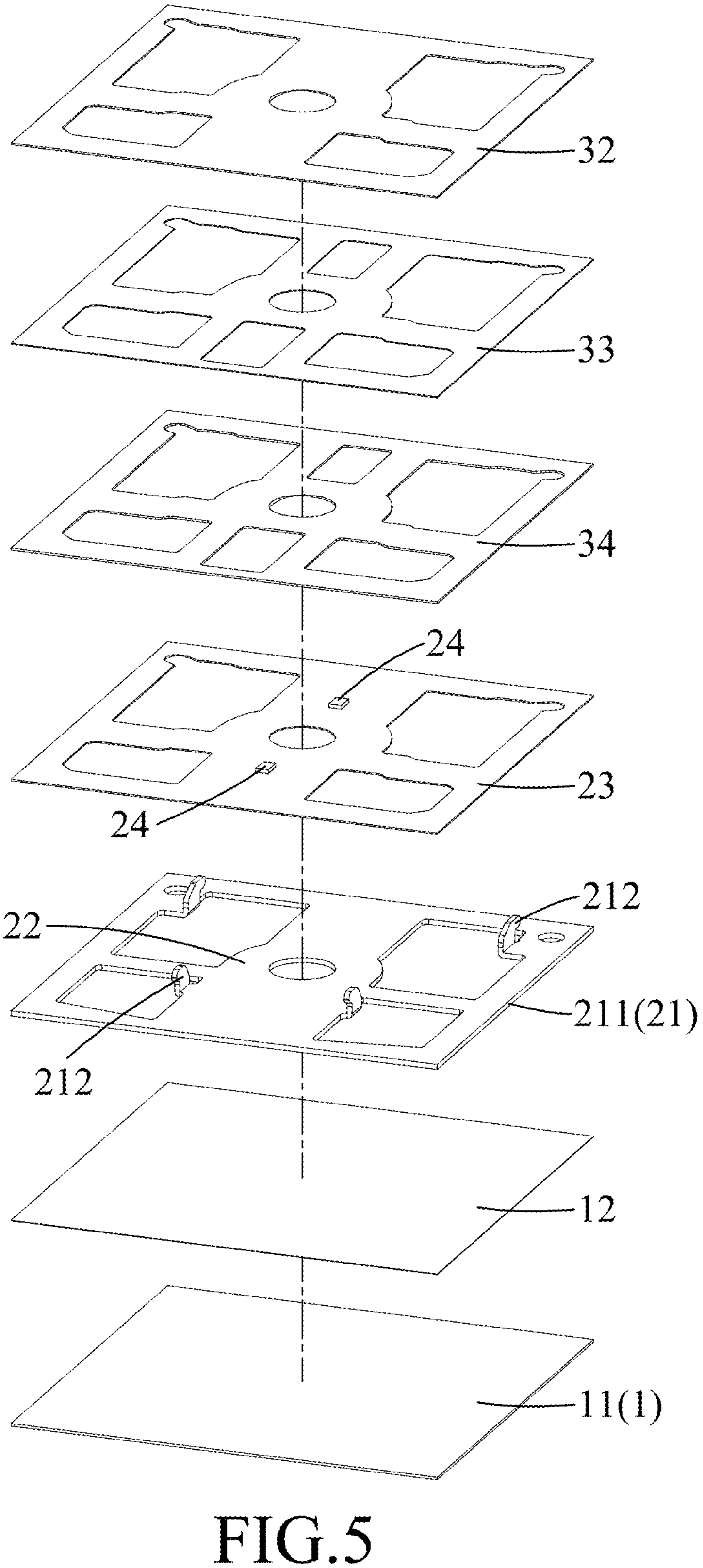
FIG. 5 is an exploded perspective view illustrating the bottom plate, the backlight module and the film module.

Referring to FIGS. 3 to 5, the film module 3 is disposed on the backlight circuit 23. The film module 3 defines four openings 30 respectively for the pivot seats 212 to be exposed from the film module 3, and two accommodating spaces 31 adjacent to the backlight circuit 23 and opening downwardly. The accommodating spaces 31 permit the light emitters 24 to respectively extend therein. The film module 3 may be pressed to generate a trigger signal. The film module 3 includes an upper thin film 32, a lower thin film 34 adjacent to the backlight circuit 23, and a spacer thin film 33 disposed between the upper thin film 32 and the lower thin film 34. The upper thin film 32, the spacer thin film 33, and the lower thin film 34 cooperatively define the accommodating spaces 31. The light emitters 24 and the accommodating spaces 31 are covered by the upper thin film 32 from above. When the upper thin film 32 is pressed to deform downward and contact the lower thin film 34, the trigger signal is generated.

In the present embodiment, the number of the accommodating spaces 31 is two, but in other modifications, the number of the accommodating spaces 31 may be one or more than two.

Referring to FIGS. 2, 3, and 5, the support module 4 includes a support 41 disposed on the film module 3 and pivotally connected to the pivot seats 212 of the metal plate 21, and an elastomer 42 disposed on the upper thin film 32 of the film module 3 and extending upwardly and outwardly from the support 41. In this embodiment, the support 41 is a scissor arm assembly.

The key cap 5 is disposed on the support module 4, and has an inner peripheral surface 51 connected to the top side of the support 41 and contacting the elastomer 42, and an outer peripheral surface 52 opposite to the inner peripheral surface 51.

In use, the backlight circuit 23 is operated to control the light emitters 24 to light up to achieve the backlight effect. When the key cap 5 is pressed to move the elastomer 42 downwardly to deform the upper thin film 32 downwardly so that the upper thin film 32 contacts the lower thin film 34, the lower thin film 34 correspondingly generates the trigger signal.

Figure 6:
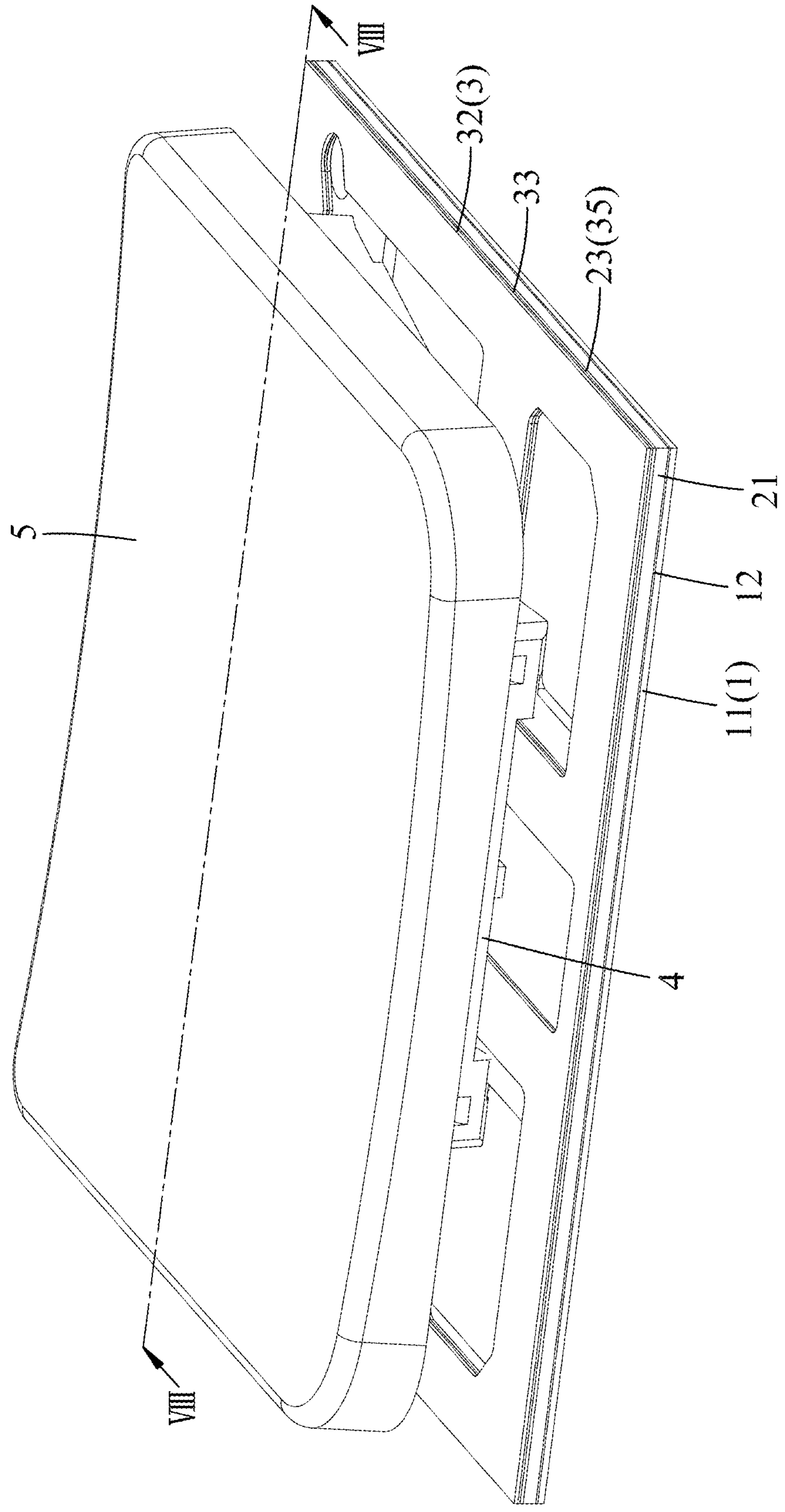
FIG. 6 is an assembled perspective view of a second embodiment of the character key device of a backlit keyboard according to the present disclosure.
Figure 7:
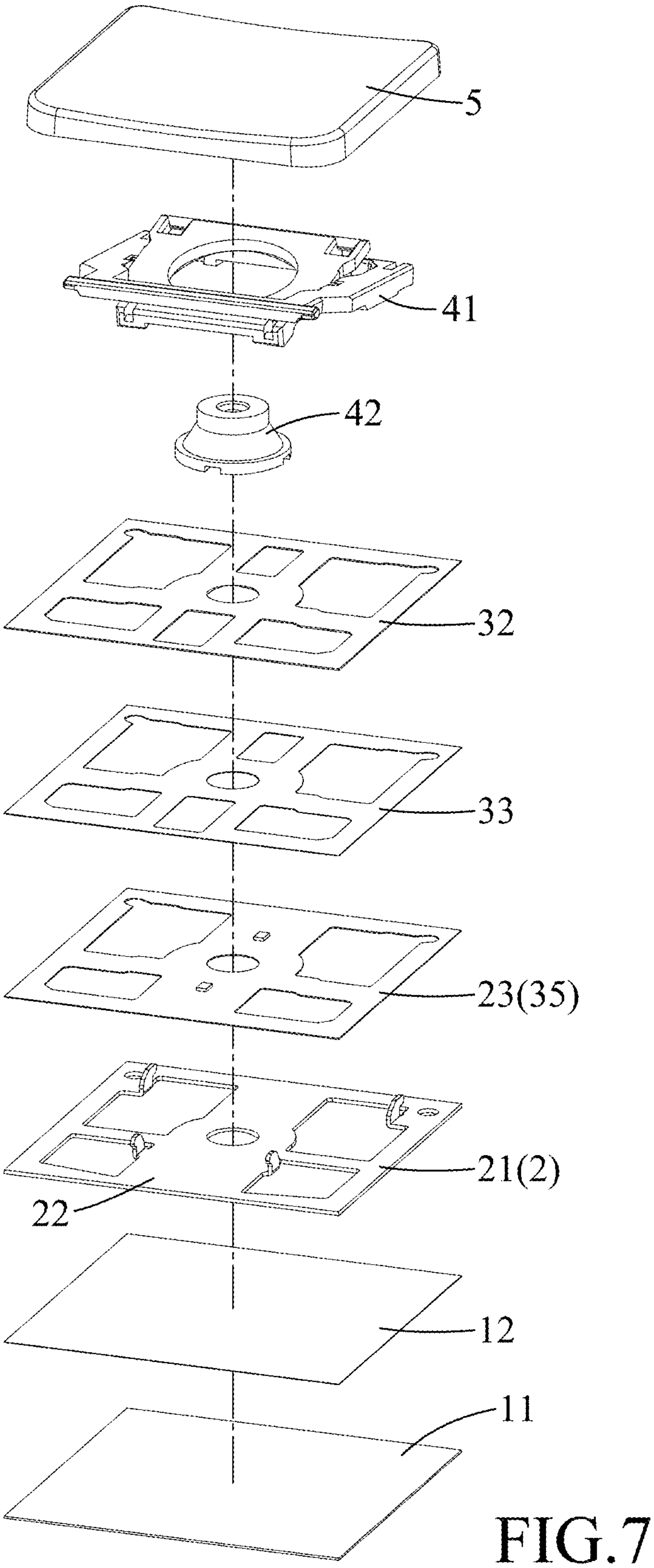
FIG. 7 is an exploded perspective view of the second embodiment.
Figure 8:
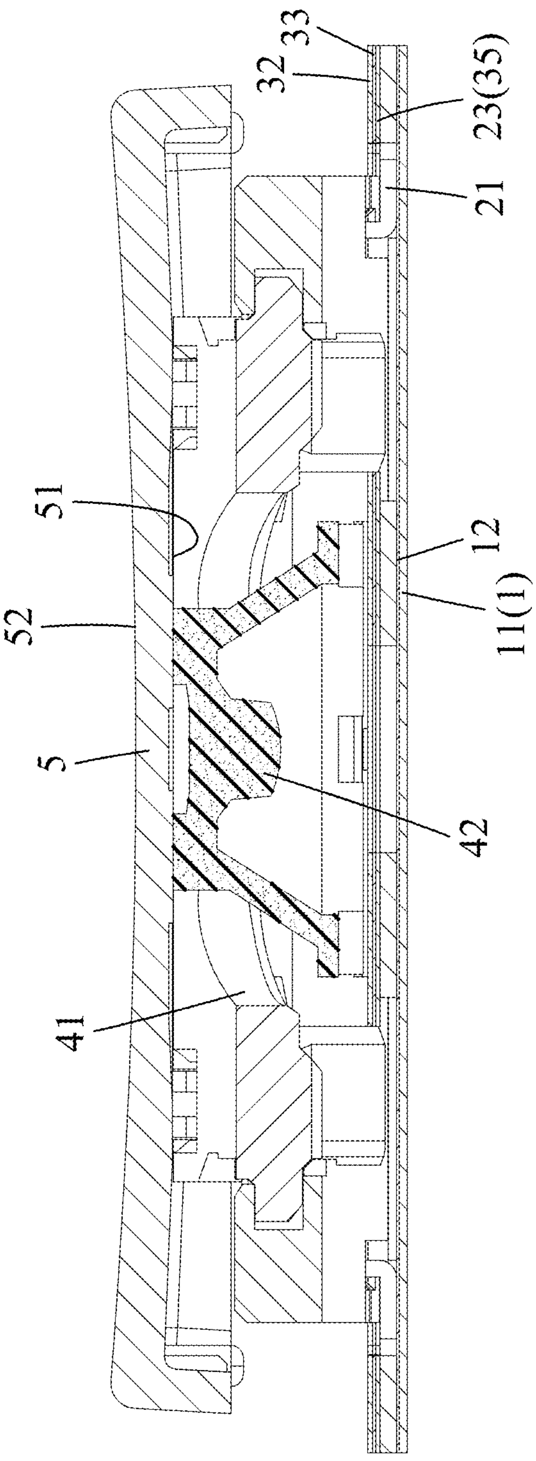
FIG. 8 is a sectional view taken along line VIII-VIII of FIG. 6.

Referring to FIGS. 6 to 8, a second embodiment of the character key device of the backlit keyboard according to the present disclosure also includes the bottom plate 1, the backlight module 2, the film module 3, the support module 4, and the key cap 5.

Figure 9:
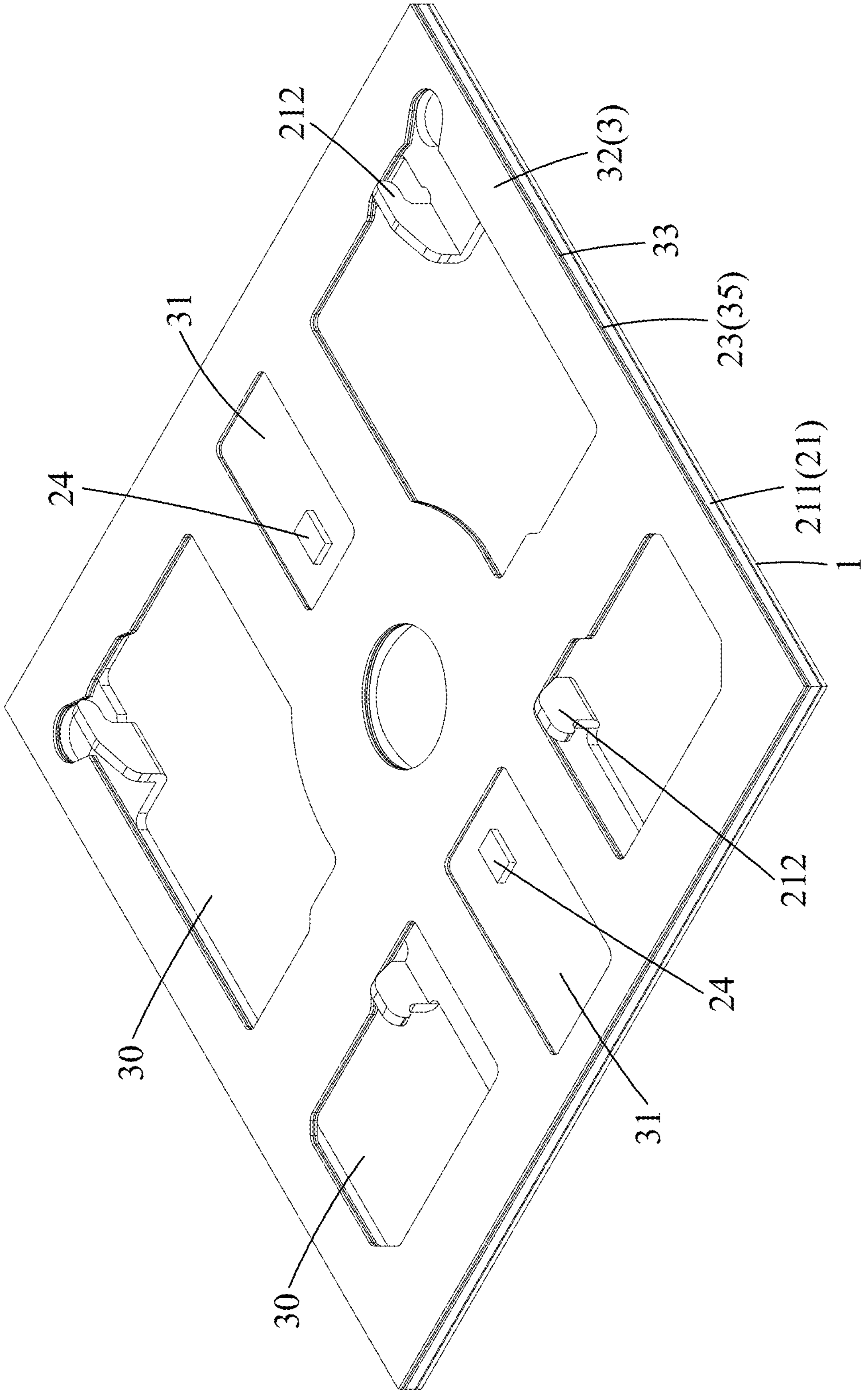
FIG. 9 is a partial exploded perspective view illustrating a bottom plate, a backlight module and a film module of the second embodiment.
Figure 10:
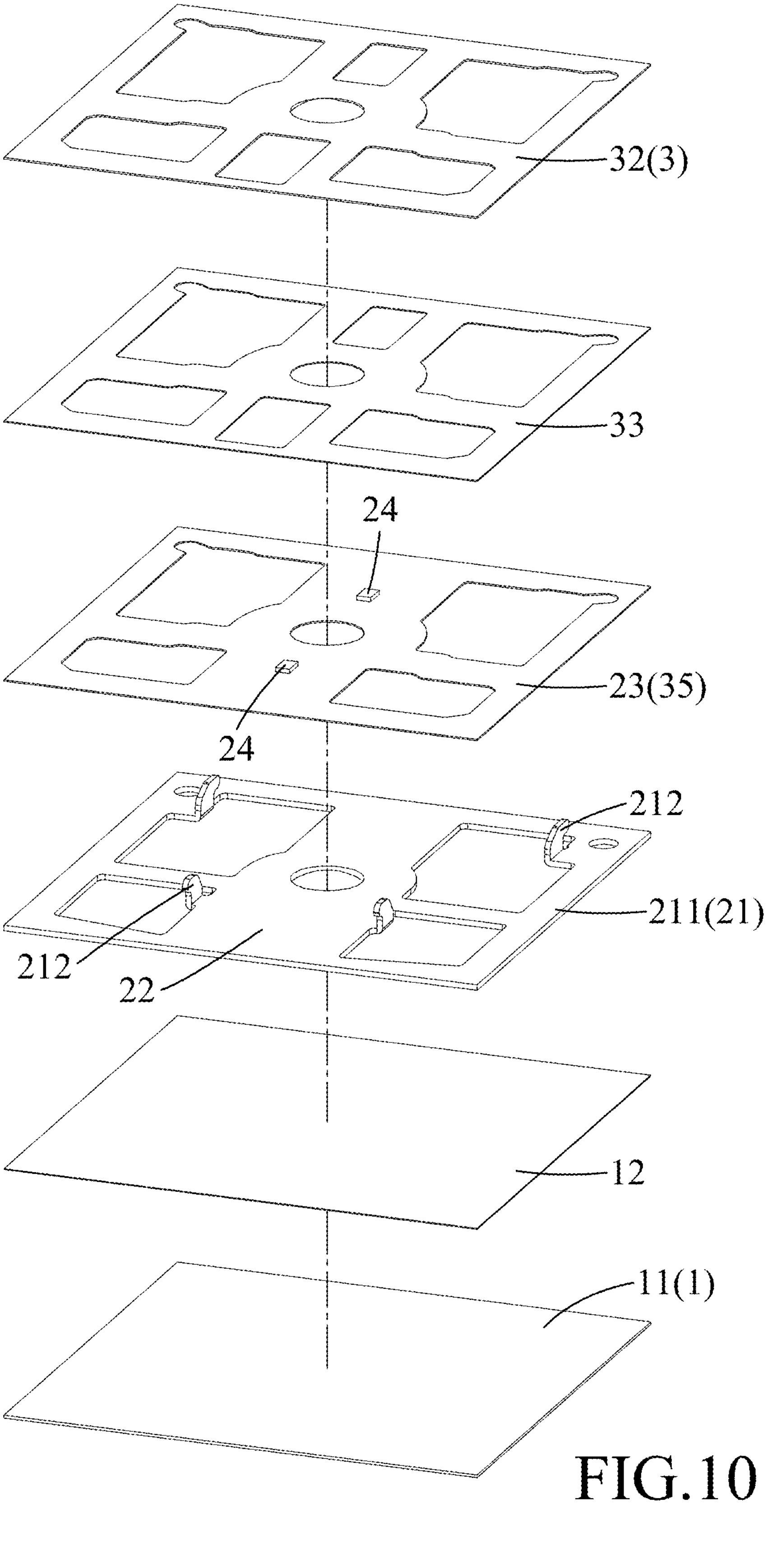
FIG. 10 is an exploded perspective view illustrating the bottom plate, the backlight module and the film module.

Referring to FIGS. 8, 9, and 10, the difference between the second embodiment and the first embodiment is that the lower thin film 34 (see FIG. 5) is omitted from the film module 3, and the film module 3 includes the upper thin film 32, an additional circuit 35 integrated with the backlight circuit 23 and co-laid with the backlight circuit 23 on the insulating layer 22, and the spacer thin film 33 disposed between the upper thin film 32 and the additional circuit 35. The upper thin film 32 and the spacer thin film 33 cooperatively define the accommodating spaces 31. After the upper thin film 32 is pressed to deform downward and contact the additional circuit 35, the additional circuit 35 correspondingly generates the trigger signal.

In the present embodiment, materials of the backlight circuit 23 and the additional circuit 35 are both copper.

Referring to FIGS. 8 and 10, in use, the backlight circuit 23 is operated to control the light emitters 24 to light up to achieve the backlight effect. When the key cap 5 is pressed to move the elastomer 42 downwardly to deform the upper thin film 32 downwardly, so that the upper thin film 32 contacts the additional circuit 35, the additional circuit 35 correspondingly generates the trigger signal.

In summary, the character key device of the backlit keyboard of the present disclosure has the following effects.

1. In the character key device of a backlit keyboard of the present disclosure, the backlight circuit 23 is laid on the insulating layer 22 of the backlight module 2, and the metal plate 21 simultaneously permits disposition of the backlight circuit 23 and the support 41, so that the amount of the plates or substrates used can be reduced, thereby reducing the overall thickness of the present disclosure. In other words, the character key device of the backlit keyboard of the present disclosure integrates the metal plate and the circuit board of a conventional backlit keyboard into the backlight module 2 of the present disclosure, so that the thickness of the backlight module 2 is much smaller than the thickness of an assembly of the metal plate and the circuit board of the conventional backlit keyboards, thereby achieving the purpose of thinning.
2. The first embodiment of the key device of the backlit keyboard of the present disclosure defines the accommodating spaces 31 by the cooperation of the upper thin film 32, the spacer thin film 33, and the lower thin film 34 of the film module 3, so that the film module 3 receives the light emitters 24 therein to prevent the light emitters 24 from affecting the overall thickness thereof, thereby achieving the purpose of thinning.
3. The second embodiment of the character key device of the backlit keyboard of the present disclosure defines the accommodating spaces 31 by the cooperation of both the upper thin film 32 and the spacer thin film 33 of the film module 3 so as to allow the film module 3 to accommodate the light emitters 24, and integrates the additional circuit 35 with the backlight circuit 23 so as to be laid out on the insulating layer 22 along with the backlight circuit 23, thereby preventing the thickness of the light emitters 24 from affecting the overall thickness and reducing the thickness of the film module 3, so as to achieve the purpose of thinning.

Therefore, the character key device of the backlit keyboard of the present disclosure effectively reduces the overall thickness, and certainly achieves the purpose of the present disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A character key device of a backlit keyboard, comprising:

a bottom plate;

a backlight module including a metal plate fixed to said bottom plate, an insulating layer disposed on said metal plate, a backlight circuit disposed on said insulating layer, and at least one light emitter electrically connected to said backlight circuit and disposed above said insulating layer, said metal plate including a metal plate body, and a plurality of pivot seats extending upwardly from said metal plate body;

a film module disposed on said backlight circuit, said film module defining at least one accommodating space adjacent to said backlight circuit and allowing said at least one light emitter to extend therein, said film module being pressable to generate a trigger signal;

a support module including a support disposed on said film module and connected to said pivot seats of said metal plate, and an elastomer disposed on said film module; and a key cap disposed on said support module, and having an inner peripheral surface connected to said support and in contact with said elastomer, and an outer peripheral surface opposite to said inner peripheral surface.

2. The character key device of a backlit keyboard as claimed in claim 1, wherein said film module includes an upper thin film for mounting of said elastomer, a lower thin film adjacent to said backlight circuit, and a spacer thin film disposed between said upper thin film and said lower thin film, said upper thin film cooperating with said spacer thin film and said lower thin film to define said at least one accommodating space, after said upper thin film is pressed to contact said lower thin film, said triggering signal being correspondingly generated.

3. The character key device of a backlit keyboard as claimed in claim 1, wherein said film module includes an upper thin film for mounting of said elastomer, an additional circuit co-laid with said backlight circuit on said insulating layer, and a spacer thin film disposed between said upper thin film and said additional circuit, said upper thin film and said spacer thin film cooperatively defining said at least one accommodating space, after said upper thin film is pressed to contact said additional circuit, said triggering signal being correspondingly generated by said additional circuit.

4. The character key device of a backlit keyboard as claimed in claim 1, wherein said bottom plate includes a bottom plate body, and an adhesive layer disposed on said bottom plate body, said metal plate being disposed on said adhesive layer to be fixedly connected to said bottom plate body.

5. The character key device of a backlit keyboard as claimed in claim 1, wherein said backlight module includes two of said light emitters electrically connected to said backlight circuit and disposed above said insulating layer, said film module defining two accommodating spaces adjacent to said backlight circuit and respectively for said light emitters to extend therein.

6. The character key device of a backlit keyboard as claimed in claim 1, wherein said film module defines a plurality of openings respectively for said pivot seats to be exposed from said film module.

7. The character key device of a backlit keyboard as claimed in claim 1, wherein said support is a scissor arm assembly.

* * * * *